United States Patent
Zerelles et al.

(10) Patent No.: US 11,524,870 B2
(45) Date of Patent: Dec. 13, 2022

(54) METHOD FOR OPERATING A LIFT SYSTEM AND LIFT SYSTEM DESIGNED FOR CARRYING OUT THE METHOD

(71) Applicant: TK Elevator Innovation and Operations GmbH, Duesseldorf (DE)

(72) Inventors: Holger Zerelles, Herdecke (DE); Eduard Steinhauer, Nürtingen (DE); Marius Matz, Filderstadt (DE); Richard Thum, Kornwestheim (DE)

(73) Assignee: TK Elevator Innovation and Operations GmbH, Duesseldorf (DE)

( * ) Notice: Subject to any disclaimer, the term of this patent is extended or adjusted under 35 U.S.C. 154(b) by 1074 days.

(21) Appl. No.: 16/088,351

(22) PCT Filed: Mar. 28, 2017

(86) PCT No.: PCT/EP2017/057241
§ 371 (c)(1),
(2) Date: Sep. 25, 2018

(87) PCT Pub. No.: WO2017/167707
PCT Pub. Date: Oct. 5, 2017

(65) Prior Publication Data
US 2020/0299102 A1    Sep. 24, 2020

(30) Foreign Application Priority Data
Mar. 30, 2016  (DE) .................. 10 2016 205 236.5

(51) Int. Cl.
*B66B 5/02*   (2006.01)
*B66B 1/24*   (2006.01)
(Continued)

(52) U.S. Cl.
CPC ............... *B66B 5/027* (2013.01); *B66B 1/24* (2013.01); *B66B 1/32* (2013.01); *B66B 1/3446* (2013.01);
(Continued)

(58) Field of Classification Search
CPC .. B66B 5/027; B66B 1/24; B66B 1/32; B66B 1/3446; B66B 5/0018; B66B 11/0407; B66B 9/003; Y02B 50/00
See application file for complete search history.

(56) References Cited

U.S. PATENT DOCUMENTS

2005/0279584 A1   12/2005  Reuter
2008/0073157 A1*   3/2008  Kanon .................... H02J 9/06
                                                    187/290

FOREIGN PATENT DOCUMENTS

CN         1694839 A       11/2005
CN       201808976 U        4/2011
(Continued)

OTHER PUBLICATIONS

English Translation of International Search Report issued in PCT/EP2017/057241, dated May 16, 2017 (mailed May 22, 2017).
(Continued)

*Primary Examiner* — Jeffrey Donels
(74) *Attorney, Agent, or Firm* — William J. Cassin (57) ABSTRACT

A method of operating an elevator system, for example operated by linear motors, wherein the elevator system includes a shaft system including at least one vertical elevator shaft, and a multiplicity of elevator cars which respectively have a plurality of functional components for carrying out different functions. The method provides that in a special operating mode of the elevator system, a first elevator car is assigned at least one auxiliary device, the auxiliary device providing a replacement function for at
(Continued)

least one function of one of the functional components of the first elevator car, the corresponding function of a functional component of the first elevator car being replaced with the replacement function provided by the auxiliary device, and the elevator system continuing to be operated by using the replacement function provided. The invention furthermore relates to an elevator system configured for carrying out such a method.

21 Claims, 7 Drawing Sheets

(51) Int. Cl.
    *B66B 1/32*     (2006.01)
    *B66B 1/34*     (2006.01)
    *B66B 5/00*     (2006.01)
    *B66B 11/04*     (2006.01)
    *B66B 9/00*     (2006.01)
(52) U.S. Cl.
    CPC ........ *B66B 5/0018* (2013.01); *B66B 11/0407* (2013.01); *B66B 9/003* (2013.01)

(56) References Cited

FOREIGN PATENT DOCUMENTS

| | | | |
|---|---|---|---|
| CN | 103827010 A | | 5/2014 |
| DE | 10 2014 105 004 A | | 7/2015 |
| EP | 0212147 A | | 3/1987 |
| EP | 0499254 A | | 8/1992 |
| EP | 2 041 015 B | | 4/2009 |
| JP | H04365759 A | | 12/1992 |
| JP | H03270805 | | 4/1993 |
| JP | H05105371 A | | 4/1993 |
| JP | H05132257 A | | 5/1993 |
| JP | 05201642 A | | 8/1993 |
| JP | H 05201642 A | * | 8/1993 |
| JP | H05201642 A | | 8/1993 |
| JP | H11217163 A | | 8/1999 |
| JP | 2004 250186 A | | 9/2004 |
| WO | 2004043842 A | | 5/2004 |
| WO | 2008136692 A | | 11/2008 |

OTHER PUBLICATIONS

Third Office Action, dated Jan. 21, 2021, in Chinese foreign counterpart application No. 201780021245.4, listing references that have not yet been cited in an Information Disclosure Statement in this application.

* cited by examiner

METHOD FOR OPERATING A LIFT SYSTEM AND LIFT SYSTEM DESIGNED FOR CARRYING OUT THE METHOD

CROSS REFERENCE TO RELATED APPLICATIONS

This application is a U.S. National Stage Entry of International Patent Application Serial Number PCT/EP2017/057241, filed Mar. 28, 2017, which claims priority to German Patent Application No. DE 10 2016 205 236.5, filed Mar. 30, 2016, the entire contents of both of which are incorporated herein by reference.

FIELD

The present disclosure generally relates to a method for operating an elevator system by means of linear motors.

BACKGROUND

Elevators systems of the applicant, in which two elevator cabins can be driven separately from one another in an elevator shaft, are known under the name Twin®. Furthermore, an elevator system driven by means of linear motors has been proposed under the name Multi® of the applicant. In such an elevator system which comprises a multiplicity of elevator cars, the elevator cars can respectively be driven along rails separately in vertical and horizontal elevator shafts. To this end, the elevator cars respectively have their own drive units. Furthermore, other elevator systems in which a plurality of elevator cars can be driven separately from one another in a shaft system are described in the prior art.

One problem which arises with such elevator systems relates to the occurrence of a fault in one of the elevator cars of the elevator system. One possibility of overcoming such a fault would be to take out of operation the entire elevator system, or at least the shaft in which the elevator car affected by the fault is located. This, of course, involves a significant reduction of the conveying capacity of the elevator system. Yet since the elevator car affected by the fault impedes the other elevator cars when they are driven in the shaft system of the elevator system, particularly since it blocks a section of the shaft system, the elevator system cannot, however, readily continue to be operated with the other elevator cars not affected by the fault. In the elevator car affected by the fault, furthermore, there may still be persons who need to be brought out of the elevator car.

In relation to this problem, various solution approaches have already been proposed. For an elevator system with two elevator cars in a shaft, it has been proposed in JP 2004250186 A respectively to provide a kind of cable winch for the upper elevator car and the lower elevator car, which may be used in order to drive the elevator car in the event of failure of the respective elevator car. Inter alia, provision is in this case made to mechanically connect the two elevator cars. A disadvantage with this solution is that extra winches need to be provided. Furthermore, this solution is suitable only for the elevator system described in the document.

DE 10 2014 105 004 A1 discloses a method for operating an elevator system with a friction hoist output, in which case a plurality of elevator cars can be driven in a single elevator shaft, independently of one another or coupled to one another. Such coupling is in this case even possible if the friction hoist output for an elevator car fails. This elevator car can therefore be brought by means of the further cabin to the closest floor, so that passengers can exit the elevator car there. For other possible defects, in particular defects in which a function of a functional component of an elevator car fails, DE 10 2014 105 004 A1 does not disclose any solutions. Furthermore, by means of the method only a position change of the elevator car affected by the fault can be carried out, so that continued operation of the elevator system with the elevator car affected by the fault is not possible.

Furthermore, EP 2 041 015 B1 discloses an elevator system with a multiplicity of elevator cars, which can be driven individually in a shaft system. In this elevator system, the occurrence of a fault of the communication system, which merely affects one elevator car, is detected. After this fault has been detected, a command is transmitted to the elevator car affected by the fault, whereupon this elevator car is parked outside the normal driving paths of the other elevator cars of the elevator system. The elevator system can then continue to be operated with the other elevator cars.

A further elevator system with a multiplicity of elevator cars, which can be driven individually in a shaft system, is known from WO 2004/043842 A1. If a fault occurs on an elevator car, provision is made that this elevator car is not subsequently used and the other elevator cars can continue to be operated unaffected thereby.

Both in EP 2 041 015 B1 and in WO 2004/043842 A1, it is a requirement that the elevator cars affected by the fault can continue to be used. This requirement, however, is not always satisfied. In particular, the case may arise that an elevator car is blocked in a shaft of the shaft system. Furthermore, in the case of an elevator system which is operated by means of linear motors, the case may occur that a rail section on which an elevator car is located cannot be electrically powered, so that this elevator car cannot be driven independently by this rail section.

Thus a need exists to improve an elevator system, in particular an elevator system operated by means of linear motors, wherein the elevator system comprises a shaft system comprising at least one vertical elevator shaft, and a multiplicity of elevator cars, and to provide an improved method for operating such an elevator system. Advantageously, the intention is to make it possible to continue to operate the elevator system, even if a fault occurs that does not affect all the elevator cars of the elevator system, in particular when the fault prevents driving of the affected elevator car in normal operation of the elevator system.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a method for operating an elevator system, in particular an elevator system operated by means of linear motors, wherein the elevator system comprises a shaft system comprising at least one vertical elevator shaft, and a multiplicity of elevator cars which respectively have a plurality of functional components for carrying out different functions.

The proposed solution provides a method for operating an elevator system, in particular a method for operating an elevator system operated by means of linear motors, wherein the elevator system comprises a shaft system comprising at least one vertical elevator shaft, and a multiplicity of elevator cars which respectively have a plurality of functional components for carrying out different functions. In this method, in a special operating mode of the elevator system, a first elevator car is assigned at least one auxiliary device. This at least one auxiliary device in this case provides a replacement function for at least one function of one of the functional components of the first elevator car. The corresponding at least one function of a functional component of the first elevator car is then replaced with the replacement function provided by the at least one auxiliary device, and the elevator system continues to be operated by using the replacement function provided. A first elevator car is therefore, in particular, an elevator car in which an abnormal function or a defect has been established. In principle, any of the elevator cars of the elevator system may be, or become, such a first elevator car.

Thus, if a function of an elevator car of an elevator system operated according to the invention fails, this function is advantageously replaced with a replacement function. This replacement function is in this case advantageously provided by an auxiliary device assigned to this elevator car, or also by a plurality of auxiliary devices assigned to this elevator car. If a plurality of functions of an elevator car of an elevator system operated according to the invention fail, this plurality of functions are advantageously replaced with one or more corresponding replacement functions. This replacement function, or these replacement functions, are in this case in turn provided by the at least one auxiliary device which is assigned to the relevant elevator car. Provision is in this case made that the auxiliary device provides a replacement function for at least one function which is originally provided by the elevator car of the respective elevator system, which then replaces the corresponding function of the elevator car. For example, if the elevator cars do not have their own drive units, as is the case with friction hoist elevators, no replacement function is provided by the auxiliary device for the function of the drive because, in this case, the drive function is—not even partially—provided by the elevator car. Other functions of the elevator car, in particular the function of the control unit, may on the other hand also be provided and replaced by the auxiliary device in a friction hoist elevator.

The proposed method is particularly advantageous in the case of a decentrally configured elevator system, in which a multiplicity of functions are not provided centrally by the elevator system, but instead the individual elevator cars respectively have corresponding functional components for carrying out these functions. Such functional components, which the elevator cars of the elevator system may in this case respectively have, are in particular their own drive unit and/or their own control unit with a multiplicity of control functions and/or their own sensor unit, in particular a sensor unit for determining one or more operating parameters, such as in particular the current position of the respective elevator car, the current speed of the respective elevator car, the current load with which the respective elevator car is loaded, and/or the current acceleration of the respective elevator car.

According to one advantageous configuration of the invention, a diagnostic unit determines which function of the first elevator car should be replaced with the replacement function provided by the at least one auxiliary device. In this case, provision may be made that the elevator cars respectively have such a diagnostic unit and/or the elevator system has a central diagnostic unit and/or the at least one auxiliary device has such a diagnostic unit. The functional component of the first elevator car, the function of which is replaced with the replacement function provided by the at least one auxiliary device, is advantageously deactivated, advantageously by using the diagnostic unit.

According to one further advantageous configuration of the invention, a protective region is formed around the first elevator car. In particular, other elevator cars of the elevator system are not allowed to drive into the protective region, so that this protective region advantageously serves to avoid collisions. Advantageously, the at least one auxiliary device may be brought into the protective region. Specifications regarding the boundaries of the protective region, in particular corresponding position data relating to the shaft system, are advantageously transmitted to the at least one auxiliary device. Particularly for collision avoidance, the at least one auxiliary device is in this case advantageously brought to the first elevator car by using means for monitoring the distance from the first elevator car. These means are for example an ultrasound, laser or radar system known in the prior art, with which the distance from an obstacle can be determined. Advantageously, this configuration further reduces the likelihood of collisions between the first elevator car and other elevator cars, as well as between the first elevator car and the at least one auxiliary device.

Also advantageously, the positions of the elevator cars of the elevator system are determined. This determination is carried out either absolutely, in particular by means of so-called shaft information systems, or relatively, in particular by detecting distances between the individual elevator cars. In the event of a fault, in particular when a functional component of an elevator car is not operating correctly or when the position of an elevator car cannot be detected, the protective region is then formed around the first elevator car. Advantageously, the position of the first elevator car and/or the position of the protective region formed around the first elevator car is transmitted to the at least one auxiliary device. By use of distance monitoring, in particular safety-related distance monitoring, the at least one first auxiliary device is then brought into the protective region to the first elevator car.

In particular, it is provided as a further configuration of the invention that it is detected that a first elevator car is damaged in the shaft system, particularly in a vertical elevator shaft or in a horizontal elevator shaft, and cannot therefore be operated normally. Advantageously, the at least one auxiliary device detects the position of the first elevator car, in particular by using a so-called absolute position sensor (APS) or by means of the last calculated position of the first elevator car. In this case, the at least one first auxiliary device is brought to the first elevator car. For further improved crash safety of the at least one first auxiliary device, one advantageous refinement of the invention provides that the at least one first auxiliary device is connected to an additional safety device, in particular to a crane or a winch. Such an additional safety device is advantageous particularly in the case of vertical recovery of the first elevator car, i.e. in the case of recovery in a vertical elevator shaft. Advantageously, the at least one first auxiliary device is coupled to the first elevator car. In this case, the at least one first auxiliary device provides the first elevator car with at least one replacement function. In particular, provision is made for the at least one first auxiliary device to safeguard the first elevator car, in particular against crashing, and/or supply the first elevator car with energy and/or undertake the control of the first elevator car. If the at least one required replacement function has been provided, the brake unit of the first elevator car is advantageously released. In the case of mechanical deactivation of the brake, a mechanical unblocking unit is advantageously provided. Advantageously, the brake of the first elevator car is manually released by means of the mechanical unblocking unit. After the brake has been released, the first elevator car is driven by using the at least one auxiliary device.

Another advantageous configuration of the invention provides that the at least one auxiliary device of the elevator system has its own drive unit, by means of which the at least one auxiliary device assigned to the first elevator car is driven to the first elevator car through the shaft system. Advantageously, the elevator system is an elevator system operated by means of linear motors, wherein the elevator cars as well as the at least one auxiliary device can be driven along the rails of the linear motor, which are installed inside the shaft system, by means of corresponding drive units. Advantageously, the at least one auxiliary device has an active drive unit, with which the auxiliary device is advantageously independent of a drive unit provided by the elevator system. By driving the at least one auxiliary device to the first elevator car, replacement functions for the first elevator car may be provided in an improved way because of the short distance between the auxiliary device and the elevator car.

According to one particularly advantageous configuration variant of the invention, the elevator system has at least one second elevator car, such a second elevator car being assigned as an auxiliary device to the first elevator car. In this configuration variant, a fully functional elevator car is therefore advantageously used as an auxiliary device for a defective or incompletely functional elevator car. Advantageously, such a second elevator car as fulfils particular criteria is assigned as an auxiliary device for a first elevator car. Advantageous criteria therefor are that the second elevator car is not carrying any persons at least at the time of assignment as an auxiliary device and/or that the second elevator car is a neighboring elevator car of the first elevator car and/or that the second elevator car is technically equipped in a particular way. It is clear that the person skilled in the art may provide further criteria for the determination of a second elevator car as an auxiliary device for a first elevator car. The use of a second elevator car as an auxiliary device for a first elevator car has, inter alia, the advantage that a special auxiliary device does not need to be maintained by the elevator system. The invention however also includes, in particular, configuration variants in which, in addition to a second elevator car as an auxiliary device for a first elevator car, especially designed auxiliary devices are additionally or exclusively provided, which are not suitable for normal person transport and therefore have a much lower weight than an elevator car. In one configuration variant of an axillary device which is not intended for normal person transport, provision may nevertheless be made that at least one specially trained expert, such as an elevator technician, can be carried by the auxiliary device inside the shaft system. Advantageously, the auxiliary device in this case does not have a cabin but only a frame, inside which the technician can place himself.

In the configuration variant of the invention, in which a second elevator car can be assigned as an auxiliary device to a first elevator car, provision is particularly preferably made that a first second elevator car is driven as a first auxiliary device to the first elevator car from a first side, and/or a second second elevator car is driven as a second auxiliary device to the first elevator car from a second side, which is opposite to the first side. If a first second elevator car is driven in a vertical shaft of the shaft system of the elevator system, for example, as a first auxiliary device from below to the first elevator car, provision is made in particular that this first second elevator car, when driving upward, can move the first elevator car upward and/or, when driving downward, can take the first elevator car down with it. If a first second elevator car is driven in a vertical shaft of the shaft system of the elevator system, for example, as a first auxiliary device from above to the first elevator car, provision is made in particular that this first second elevator car, when driving upward, can pull the first elevator car upward. In particular when the first elevator car is in a horizontal shaft of the elevator system, provision is made that a first second elevator car, as a first auxiliary device, is driven from the left-hand side to the first elevator car and a second second elevator car, as a second auxiliary device, is driven from the right-hand side to the first elevator car, so that the first elevator car can be driven or moved to the right by means of the first second elevator car and can be driven or moved to the left by means of the second second elevator car.

As a configuration variant, in particular for horizontal shafts of the shaft system, provision is made that the at least one auxiliary device is advantageously an apparatus by means of which a first elevator car located in the horizontal shaft can be pulled or pushed out of the horizontal shaft.

Advantageously, a mechanical connection is established between the first elevator car and the at least one auxiliary device. This mechanical connection is advantageously suitable to withstand forces occurring when driving the first elevator car. This means, in particular, that the mechanical connection established is configured so that the at least one auxiliary device can pull and/or push the first elevator car. The mechanical connection, which is established between the at least one auxiliary device and the first elevator car, is in this case a releasable connection. The mechanical connection is advantageously provided only until the provision of a replacement function is no longer needed, for example because the first elevator car has been brought outside the driving paths of the other elevator cars by means of the at least one auxiliary device. In particular, provision may be made that, in order to establish the mechanical connection, the at least one auxiliary device has corresponding hook or grip elements and the elevator cars, in particular the first elevator car, have correspondingly complementarily configured elements, which can be engaged from behind with the hook or grip elements.

According to one advantageous configuration of the invention the elevator cars of the elevator system respectively have, as a functional component, a drive unit by means of which the elevator cars can respectively be driven independently in the shaft system, the replacement function provided by the at least one auxiliary device replacing the drive function of the drive unit of the first elevator car. Thus, for example, if the drive unit of the first elevator car has failed so that it can no longer be driven, provision is advantageously made that at least one auxiliary device is driven to this first elevator car. Preferably, at least one mechanical connection is then established between the at least one auxiliary device and the first elevator car. By driving the at least one auxiliary device, the first elevator car is then also driven, by the at least one auxiliary device pulling or pushing the first elevator car with it.

It is therefore regarded to be particularly advantageous for the elevator cars of the elevator system respectively to have, as a functional component, a drive unit by means of which the elevator cars can respectively be driven independently or individually in the shaft system, the replacement function provided by the at least one auxiliary device replacing the drive function of the drive unit of the first elevator car in that, by using the mechanical connection between the at least one auxiliary device and the first elevator car, the first elevator car is driven in the shaft system by driving the at least one auxiliary device. According to another advantageous configuration, as a function of the load of the first elevator car, a decision is made whether one auxiliary device or a plurality of auxiliary devices are assigned to the first elevator car. If the first elevator car is unladen, the first elevator car is advantageously assigned only one auxiliary device. Furthermore, as a function of the load of the first elevator car, a decision may be made whether an auxiliary device is driven to the first elevator car from above or below or from both sides. In particular when the first elevator car is fully loaded, auxiliary devices are advantageously driven to the first elevator car from both sides.

According to another particular advantageous configuration of the invention, provision is made that an electrically conductive connection is established between the first elevator car and the at least one auxiliary device, an electricity supply for the first elevator car being provided by means of the electrically conductive connection produced. By means of the at least one auxiliary device, it is therefore advantageously possible to supply the first elevator car with energy. To this end, provision may be made for the at least one auxiliary device to have a battery and/or an accumulator, preferably a multiplicity of lithium ion cells, such as are for example also used in electromobility for hybrid or electrical vehicles. As an alternative or in addition thereto, provision is made that the auxiliary device has a connection to an electricity network and provides the link to this electricity network. If functions of the first elevator car cannot be carried out because no energy therefor can be provided by the first elevator car, this energy can be advantageously provided by means of the at least one auxiliary device.

In another advantageous configuration variant of the invention, the elevator cars of the elevator system respectively have, as a functional component, an electricity supply. By means of this electricity supply, the elevator cars are respectively supplied with the required electrical energy, the replacement function provided by the at least one auxiliary device replacing the function of the energy provision of the electricity supply of the first elevator car. Such a replacement of the function of the energy provision of the electricity supply of the first elevator car is in this case provided, in particular, when a defect or a malfunction relating to the electricity supply of the first elevator car has occurred.

According to another particular advantageous configuration of the invention, provision is made that a communication connection is established for transmitting data between the first elevator car and the at least one auxiliary device. In particular, provision is made that, by using this communication connection, data can be transmitted between the first elevator car and the at least one auxiliary device in order to establish, by means of a diagnostic unit provided by the at least one auxiliary device, which function of the first elevator car is not functioning correctly and should therefore be replaced with a replacement function provided by the at least one auxiliary device. Furthermore, provision is made in particular to transmit control commands to the first elevator car by means of the communication connection established between the first elevator car and the at least one auxiliary device, in order to control functions of the first elevator car. Furthermore, provision is made in particular to transmit operating parameters recorded by the first elevator car, in particular by sensor units of the first elevator car, from the first elevator car to the at least one auxiliary device by means of the communication connection established between the first elevator car and the at least one auxiliary device. These operating parameters may then, in particular, be forwarded to a control unit and/or the group controller of the elevator system, in particular so that the elevator system can continue to be operated while using the replacement function provided.

In particular, provision is furthermore made that functional components of the first elevator car are controlled by means of the communication connection, in particular a brake of the first elevator car and/or a door of the first elevator car and/or a display of the first elevator car and/or a loudspeaker of the first elevator car and/or illumination of the first elevator car and/or an intercom of the first elevator car and/or a diagnostic device of the first elevator car. Advantageously, the control commands are in this case transmitted from the at least one auxiliary device to the first elevator car.

In another advantageous configuration of the invention, the elevator cars of the elevator system respectively have, as a functional component, a communication interface for transmitting and/or receiving data. By means of this communication interface, the elevator cars respectively transmit and/or receive, in particular, data relating to the operation of the elevator system, the replacement function provided by the at least one auxiliary device replacing the function of transmitting and/or receiving data by means of the communication interface of the first elevator car. The first elevator car can then therefore advantageously also transmit and/or receive data in the special operating mode when the communication interface of the first elevator car is defective or at least is functioning incorrectly.

According to one advantageous configuration of the invention, the elevator cars of the elevator system respectively have their own control unit, these control units together forming at least a part of the control system of the elevator system, in particular as part of a group controller, and controlling the driving of the elevator cars in the shaft system, the replacement function provided by the at least one auxiliary device replacing the function of the control by means of the control unit of the first elevator car. Even if the control unit of the first elevator car fails, the first elevator car can therefore advantageously continue to be controlled by using the at least one auxiliary device assigned to this first elevator car.

In particular, the invention furthermore provides that a change is carried out from a normal operating mode of the elevator system to the special operating mode when a defect relating to a first elevator car is detected. A normal operating mode in this case refers, in particular, to the fault-free operation of an elevator system, i.e. when the elevator cars of the elevator system can be driven as intended by the controller, in order to be able to carry persons between floors. If a fault occurs during such a normal operating mode and is detected by the elevator system or a component of the elevator system, provision is advantageously made for the elevator system to change from the normal operating mode into the special operating mode. Advantageously, in the special operating mode, at least some of the elevator cars continue to be driven as in the normal operating mode, at least so long as these elevator cars are not impeded by the elevator car affected by the fault or the elevator cars affected by the fault. As an advantageous configuration variant, provision is also made, in particular, to take at least the elevator cars which travel inside the same shaft as the first elevator car, i.e. the elevator car affected by a fault, out of operation until the at least one auxiliary device is assigned to the first elevator car and the at least one auxiliary device has provided the first elevator car with a replacement function required for continued operation of the first elevator car, or the replacement functions required for continued operation of the first elevator car. Only after this are the elevator cars which have been taken out of operation operated again.

It is provided as another advantageous configuration of the method according to the invention that, when a defect relating to a first elevator car is detected, a brake of this first elevator car is triggered. Advantageously, the triggering of the brake is carried out in such a way that the first elevator car is braked by the triggering of the brake and held in a fixed position in the shaft system. If this first elevator car is already stationary, it is clear that this elevator car is no longer braked when the brake is triggered, but is merely held in the fixed position in the shaft system.

As an advantageous refinement of this configuration of the method according to the invention, in particular when the first elevator car is in a vertical shaft, provision is made that the at least one auxiliary device is mechanically connected to the first elevator car, which is held in the fixed position in the shaft system by triggering the brake. Advantageously, to this end the at least one auxiliary device is coupled to the first elevator car, for example as described in JP 2004250186 A. After the mechanical coupling of the at least one auxiliary device to the first elevator car, provision is in particular furthermore made that the brake of the first elevator car is released so that the weight of the first elevator car is received by the at least one auxiliary device. The at least one auxiliary device in this case advantageously carries, or holds, the first elevator car. The first elevator car is then advantageously driven into a stopping position of the elevator system by means of the at least one auxiliary device. The first elevator car is in this case, so to speak, towed by the at least one auxiliary device. In the stopping position, a door of the first elevator car is advantageously opened, particularly in order to allow persons inside the first elevator car to get out of the first elevator car. For opening the door or doors of the first elevator car, a replacement function may, in particular, again be provided by the at least one auxiliary device.

Advantageously, the opened door of the first elevator car is closed again after opening, in particular when it has been detected that there are no longer any persons in the first elevator car. The detection may in this case, in particular, be carried out by means of a load measuring device of the first elevator car and/or by means of a load measuring device provided as a replacement function by the at least one auxiliary device. After the door of the first elevator car has been closed, this first elevator car is advantageously driven into a depot region of the elevator system, located outside the driving paths of the elevator cars, by means of the at least one auxiliary device. Such a depot region may, in particular, be a shaft or a shaft section of the shaft system of the elevator system, through which no floors are driven to. Advantageously, the elevator cars of the elevator system which are not affected by the fault are no longer hindered from driving to stopping positions by the first elevator car after the first elevator car has been driven into the depot region.

Another advantageous refinement of the invention provides that, in addition to the mechanical connection between the first elevator car and the at least one auxiliary device, an electrically conductive connection and a communication connection are established. In this case, electrical energy is advantageously provided for the first elevator car by means of the at least one auxiliary device by means of the electrically conductive connection, in particular so that energy-requiring intact functional components of the first elevator car can continue to be operated. By means of the communication connection, brake control commands for controlling the brake of the first elevator car are advantageously transmitted, in particular brake control commands to release the brake before driving to the stopping position, and to actuate the brake in the stopping position, and to re-release the brake in order to drive the first elevator car further into the depot region. The brake of the first elevator car is in this case advantageously controlled according to the brake control commands received.

Advantageously, door control commands for controlling the doors of the first elevator car are also transmitted by means of the communication connection, in particular door control commands for opening the doors in the stopping position and for closing the doors before driving the first elevator car out of the stopping position. The door control command for closing the doors of the first elevator car in the stopping position is, however, preferably transmitted only when it has been detected that there are no longer any persons in the first elevator car. The doors of the first elevator car are in this case advantageously controlled according to the received door control commands.

According to another advantageous configuration of the invention, the first elevator car is driven into a depot region, located outside the driving paths of the elevator cars, by using the replacement function provided by the at least one auxiliary device. Advantageously, after the elevator car has been driven into the depot region, the elevator system is brought from the special operating mode into a normal operating mode in relation to the other elevator cars. The special operating mode is therefore advantageously ended until a fault relating to a further first elevator car is again detected. Then, a change is again made from the normal operating mode into the special operating mode.

The elevator system furthermore proposed in order to achieve the object mentioned in the introduction is an elevator system configured for carrying out the method according to the invention and/or for carrying out configuration variants and refinements of the method according to the invention. The elevator system comprises, in particular, a shaft system with at least one vertical elevator shaft and a multiplicity of elevator cars which can be driven in the shaft system. Advantageously, the elevator cars respectively have their own drive unit, with which the elevator cars can be driven independently in the shaft system. In particular, provision is furthermore made for the elevator system to have at least one auxiliary device. The auxiliary device may, in particular, be configured as a drivable platform with corresponding functional components, which are suitable for providing the required replacement functions. As an auxiliary device, however, in particular further elevator cars of the elevator system may also respectively be provided. Their functional components are in this case advantageously always configured in such a way that they can also be used as a replacement for a functional component of a faulty elevator car. A replacement function provided need not in this case necessarily provide the full functional scope of the function replaced by the replacement function. In particular, provision is made that an auxiliary device provided by the elevator system provides, in particular, a diagnostic unit and/or a control unit and/or a drive unit and/or one or more sensor units and/or a communication interface and/or an electricity supply. In particular, according to one advantageous configuration of the auxiliary device, provision is made that, by means of the auxiliary device, evacuation of persons from an elevator car affected by a fault can be carried out by means of the auxiliary device. Preferably, the elevator system is equipped with a destination call system.

Figure 1:
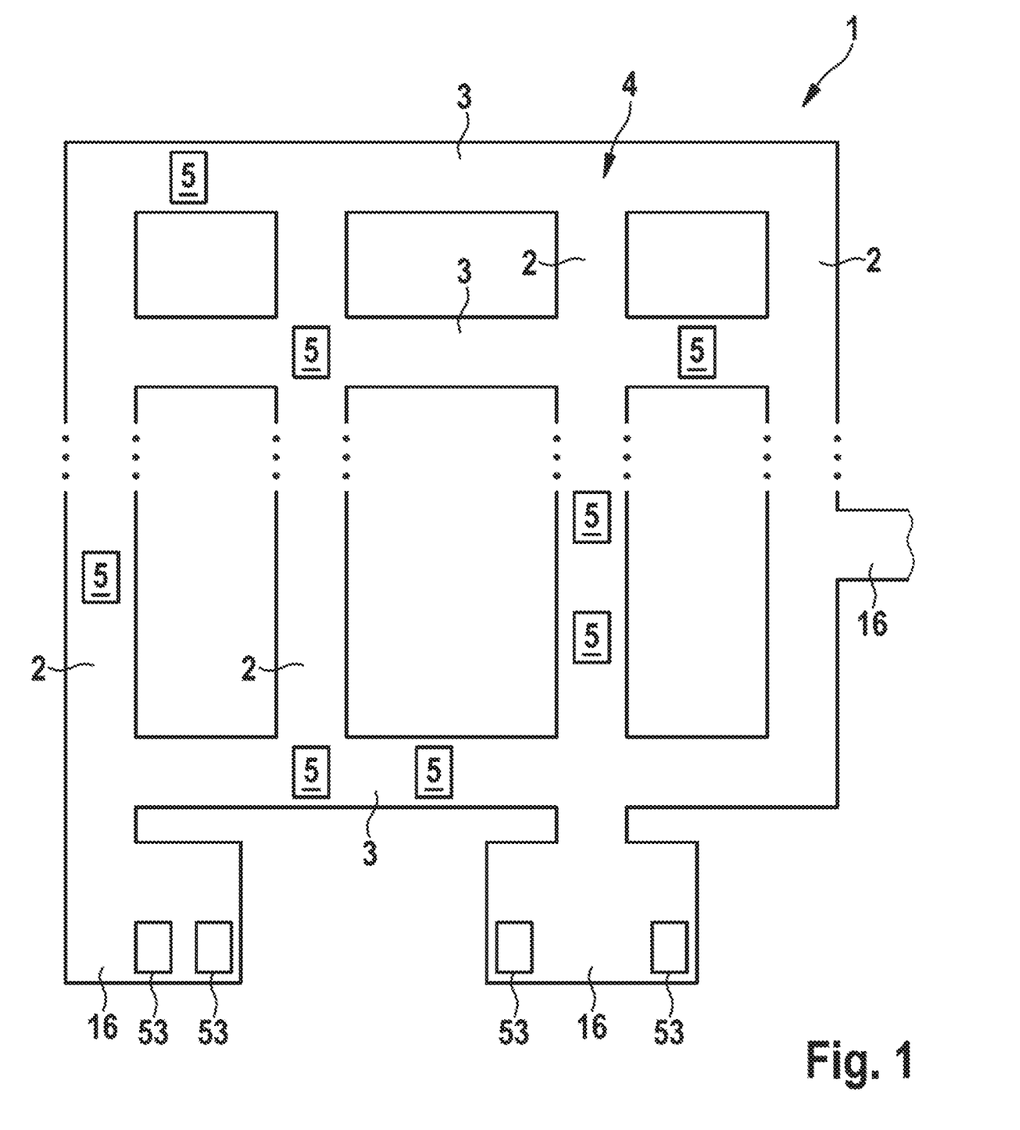
FIG. 1 is a simplified schematic view of one exemplary embodiment of an elevator system configured and operated in a normal operating mode.
Figure 2:
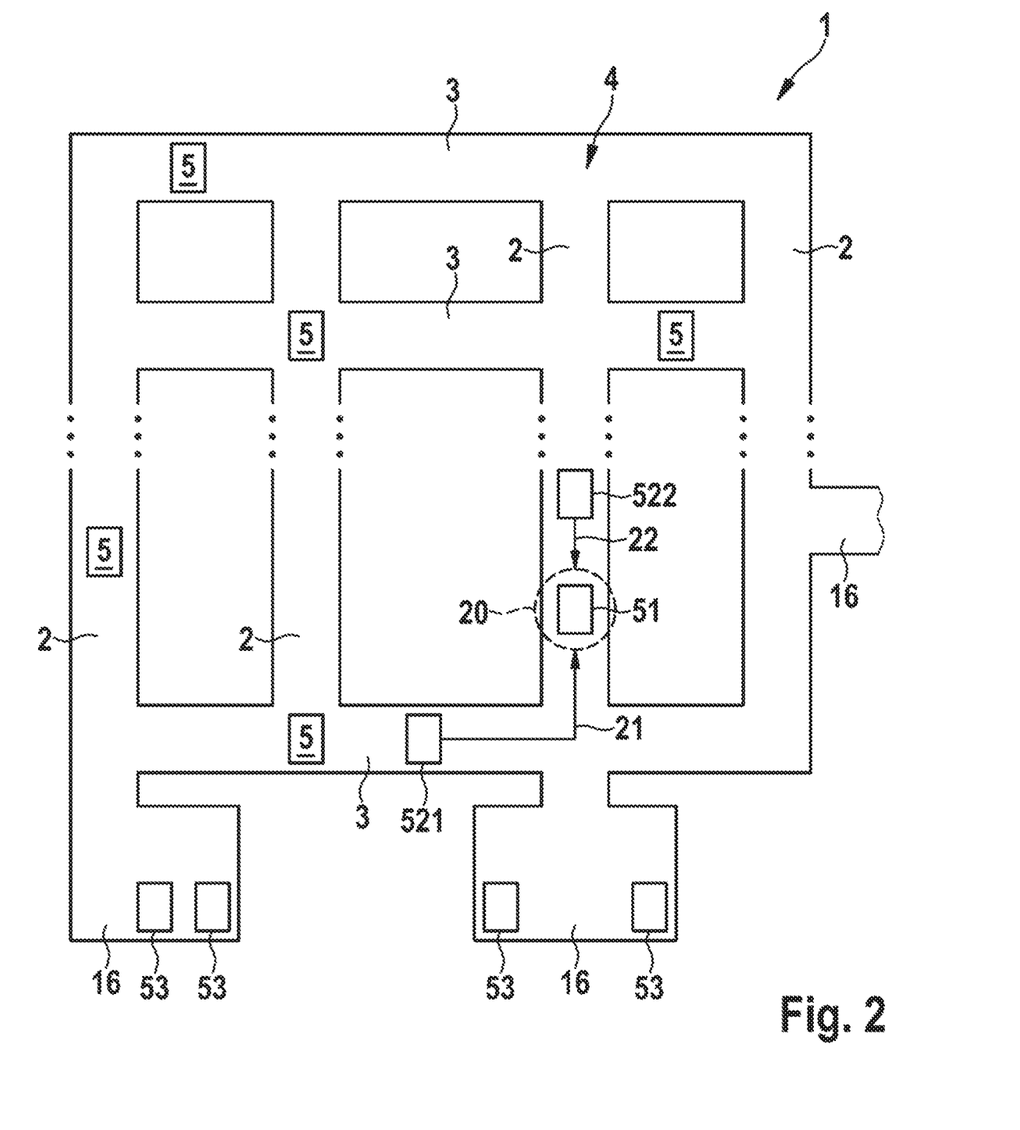
FIG. 2 is a simplified schematic view of one exemplary embodiment of an elevator system configured and operated in a special operating mode.
Figure 3:
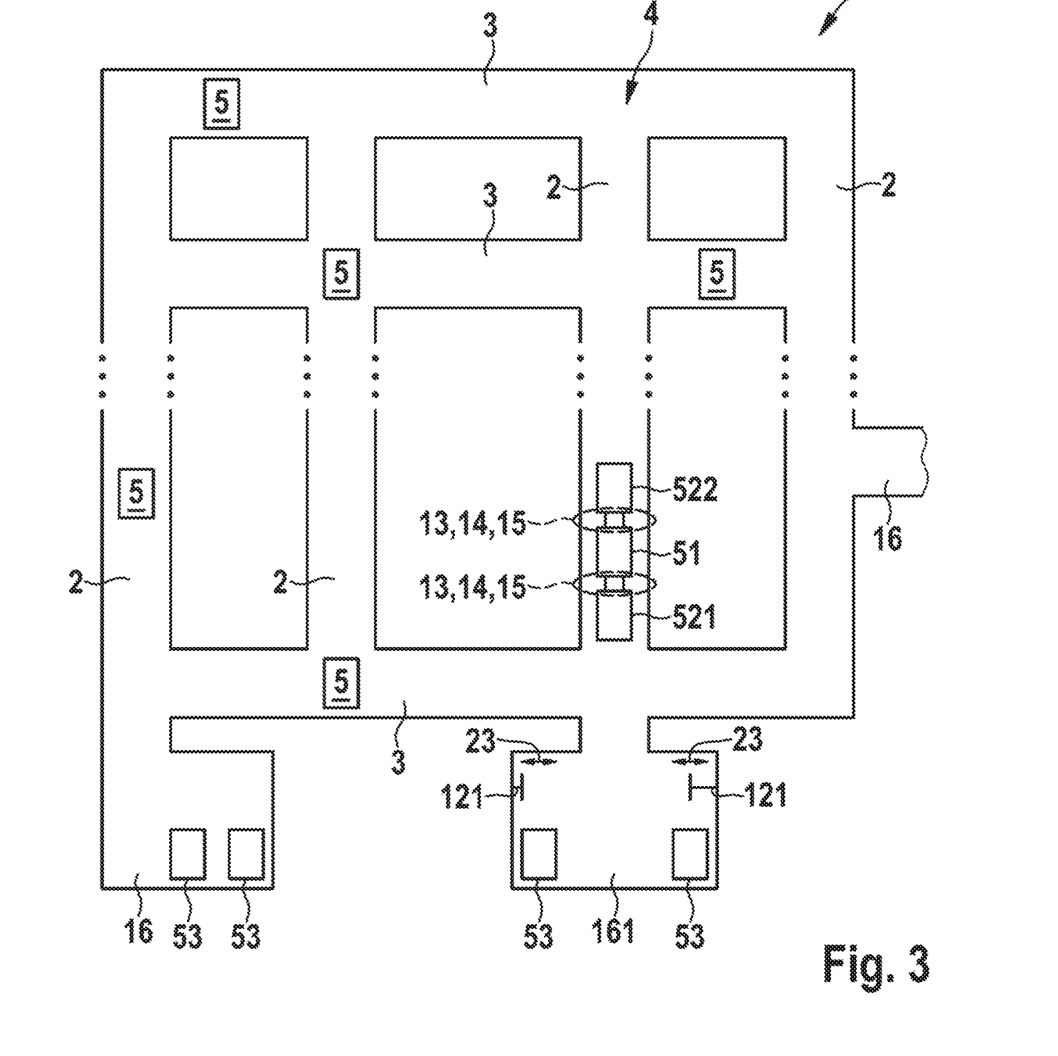
FIG. 3 is a simplified schematic view of another exemplary embodiment of an elevator system configured and operated in a special operating mode.

FIG. 1 to FIG. 3 represent one exemplary embodiment of an elevator system 1 configured according to the invention. The dots arranged vertically one below the other in this case symbolically represent the fact that the elevator system 1 is actually configured to be significantly larger, in particular significantly higher, for example for use in high-rise buildings or skyscrapers.

The elevator system 1 respectively represented in FIG. 1 to FIG. 3 comprises a shaft system 4 with a multiplicity of vertical elevator shafts 2 and horizontal elevator shafts 3. Furthermore, the elevator system 1 comprises a multiplicity of elevator cars 5, which can be driven inside the shaft system 4. In this case, provision is made in particular that the elevator 1 is an elevator system operated by means of linear motors. The elevator cars 5 are in this case advantageously driven by a traveling magnetic field along rails, to which end the elevator cars respectively have their own drive unit (not explicitly represented in FIG. 1 to FIG. 3). The elevator cars 5 of the elevator system 1 may in this case advantageously be driven individually in the vertical shafts 2 and the horizontal shafts 3 by using their respective drive unit. So that an elevator car 5 can change from a vertical shaft 2 to a horizontal shaft 3 or from a horizontal shaft 3 to a vertical shaft 2, corresponding exchanger units are advantageously provided (not explicitly represented in FIG. 1 to FIG. 3). In particular, such exchanger units may be rotatable rail sections, which by a rotation through 90° allow a direction change through 90° for an elevator car which is in the exchanger unit.

Besides the shafts 2, 3, in which the elevator cars 5 can be driven in order to convey persons between different floors, the elevator system 1 has depot regions 16, in which defective elevator cars 5 or elevator cars 5 not required because of a lower level of traffic can be parked. In FIG. 1, by way of example, four parked elevator cars 53 are represented in the depot regions 16.

In particular, the elevator system 1 may have a destination call controller. That is to say an elevator user on a calling floor enters the floor desired by him on a destination call terminal or by means of a mobile terminal, and by means of the control system of the elevator system 1 an elevator car 5 which conveys the elevator user from the calling floor to the selected target floor is determined. Advantageously, in this case, each elevator car 5 has its own control unit (not explicitly represented in FIG. 1 to FIG. 3). The control units of the elevator cars 5 in this case advantageously together form a decentral control system of the elevator system 1.

FIG. 1 shows the elevator system 1 in a normal operating mode. This means that the elevator cars 5 can be driven in the shaft system 4 in order to serve calls as intended. The elevator cars 5 may in this case, in particular, exchange data with one another. By this data exchange, advantageously, an optimal elevator car for conveying persons may be determined respectively with a view to various criteria, such as in particular waiting time of the elevator user until the elevator car arrives, waiting time of the elevator user until reaching the destination floor selected by him, energy requirement of the elevator system and/or occupancy of the elevator car provided. Advantageously, an elevator car 5, or its control unit, in this case always knows at least the current operating parameters of the directly neighboring elevator cars 5, such as in particular the current position of the neighboring elevator cars, the next stop of the neighboring elevator cars, the current speed with which the neighboring elevator cars are being driven, and/or the current acceleration with which the neighboring elevator cars are being accelerated while being driven. By taking into account the operating parameters of neighboring elevator cars, collisions between elevator cars are in this case advantageously prevented.

The elevator system 1 in this case changes, in particular, from the normal operating mode to a special operating mode when a fault or an error is detected in relation to one of the elevator cars 5 or in relation to a plurality of the elevator cars 5.

This case is represented by way of example in FIG. 2. There, a circle 20 symbolically represents that a fault has been detected in relation to a first elevator car 51. The elevator system 1 thereupon changes from the normal operating mode to the special operating mode.

In the special operating mode of the elevator system 1, the first elevator car 51 is assigned a first second elevator car 521 and a second second elevator car 522 as an auxiliary device. The first second elevator car 521 it is then driven from below to the first elevator car 51, which is symbolically represented in FIG. 2 by the arrow 21. Furthermore, the second second elevator car 522 is driven from above to the first elevator car 51, which is symbolically represented in FIG. 2 by the arrow 22.

If the first second elevator car 521 and the second second elevator car 522 have reached the first elevator car 51, a mechanical connection 13, an electrically conductive connection 14 and a communication connection 15 are respectively established between the first elevator car 51 and the first second elevator car 521 and between the first elevator car 51 and the second second elevator car 522, which is symbolically represented in FIG. 3 by the dashed ellipses.

In order to establish the mechanical connection 13, provision is made in particular that hook pairs engage in one another respectively (not explicitly represented in FIG. 3). In each case, the mechanical connection 13 are respectively configured in such a way that the mechanical connections 13 are suitable for holding the weight of the elevator cars 51, 521, 522 connected by them, in particular also when driving the elevator cars 51, 521, 522. The electrically conductive connection 14 and the communication connection 15 between the elevator cars 521, 522 functioning as an auxiliary device and the faulty elevator car 51 are advantageously established by means of a plug-in connection. Such a plug-in connection may, in particular, jointly be produced when establishing the mechanical connection 13. As a configuration variant, provision may also be made for the communication connection 15 to be established wirelessly. A prerequisite for this is that the elevator cars 5, 51, 521, 522 are respectively configured for wireless communication, for example by means of a WLAN connection.

By means of the connections 13, 14, 15 established between the auxiliary devices 521, 522 and the faulty elevator car 51, the auxiliary device 521 and the auxiliary device 522 provide the faulty elevator car 51 with a replacement function for the functions of the elevator car 51 which are affected by the fault. The replacement functions provided by the elevator cars 521 and 522 functioning as an auxiliary device then replace the corresponding functions of the faulty elevator car 51. The elevator system 1 then continues to be operated by using the replacement functions provided.

In particular, in the exemplary embodiment represented in FIG. 3, provision may be made that the elevator car 51 can no longer be driven because its drive unit (not explicitly represented in FIG. 3) is damaged. The drive function of the elevator car 51 is in this case replaced by the elevator cars 521, 522 functioning as an auxiliary device. This is done by means of the corresponding drive units of the elevator cars 521 and 522. If the elevator car 51 is empty, i.e. there are no persons in the elevator car 51, provision is made that it is driven into the depot region 161 by means of the elevator cars 521 and 522, which hold the elevator car 51 by means of the mechanical connection 13. The elevator car 51 may be parked there, and in particular also repaired. Further auxiliary devices 121 may furthermore be provided in the depot regions 16, 161, and in particular also in the horizontal shafts 3. These further auxiliary devices 121 may, in particular, be pulling or pushing mechanisms built into the shaft system 4. The further auxiliary devices 121 represented by way of example in FIG. 3 are in this case movable in the directions symbolized by the arrows 23, and configured in order to move an elevator car 5 in the horizontal direction.

A further exemplary embodiment of the present invention will be described with reference to FIG. 4 to FIG. 7. Various method steps will in this case be further explained with the aid of FIG. 4 to FIG. 7.

FIG. 4 to FIG. 7 respectively show a section of an elevator system, such as is represented for example in FIG. 1 to FIG. 3. FIG. 4 to FIG. 7 in this case respectively show a section of a vertical shaft 2 which connects two stopping positions 171 and 172 on different floors to one another. The stopping positions 171 and 172 in this case respectively have shaft doors 18 (respectively denoted in FIG. 4 to FIG. 7 by dashed lines), through which persons can enter or exit an elevator car.

The elevator cars 51 of the elevator system, a section of which is represented in FIG. 4 to FIG. 7, respectively have, as functional components, a drive unit 6, a control unit 7, a diagnostic unit 8, a load measuring unit 9 and a communication interface 10, which are respectively represented only symbolically in FIG. 4 to FIG. 7.

Figure 4:
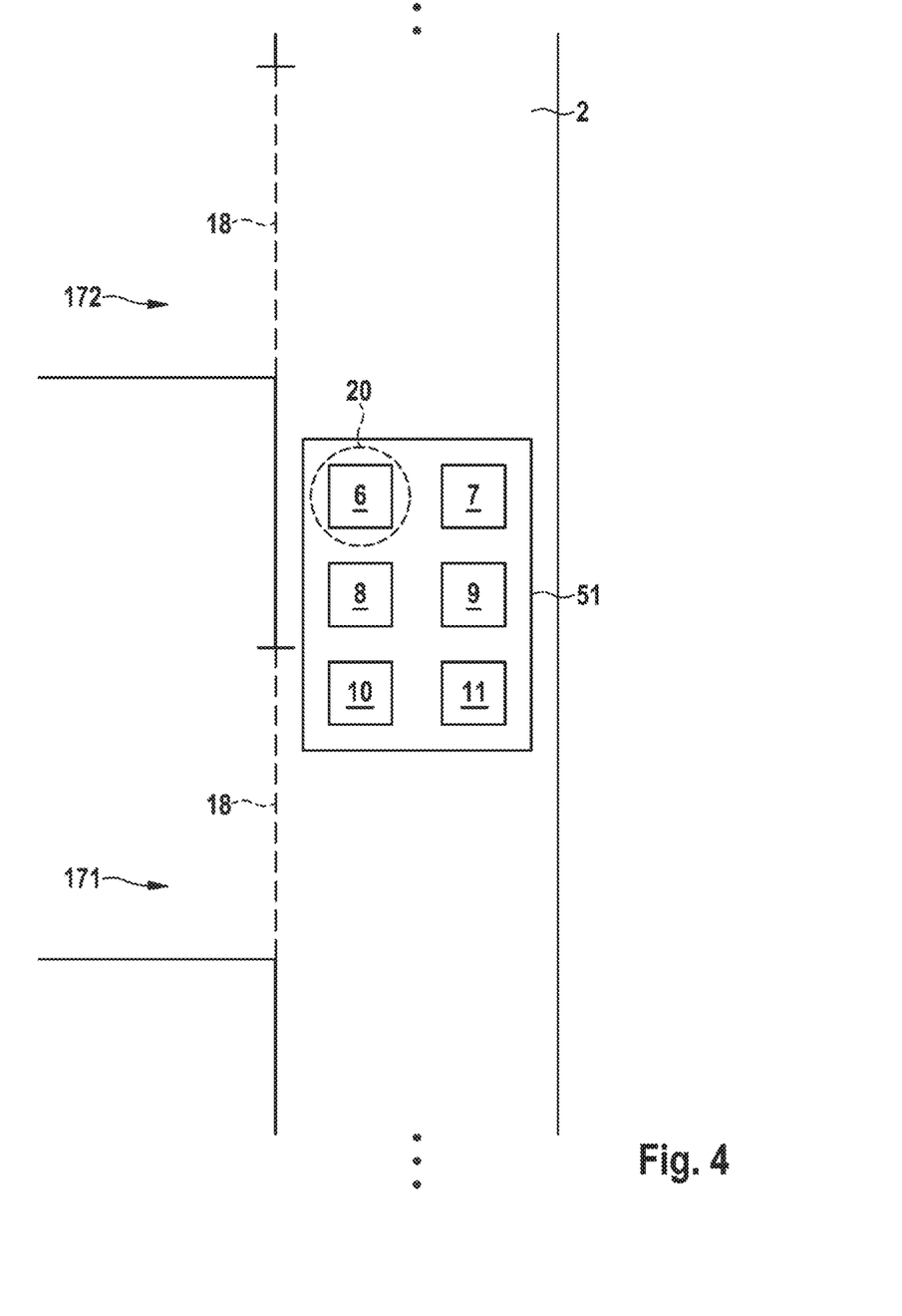
FIG. 4 is a simplified sectional schematic view of one exemplary embodiment of an elevator system configured to explain first method steps of one exemplary embodiment of a method.

By way of example, FIG. 4 represents a first elevator car 51, in which a fault has been detected in relation to the drive unit 6, which is symbolically represented in FIG. 4 by the circle 20. This fault has in this case been detected by the diagnostic unit 8 of the elevator car 51. In principle, it is also conceivable for the fault to be detected by a diagnostic unit of another elevator car (not represented in FIG. 4) during corresponding exchange of data with the elevator car 51. Because of the fault of the drive unit 6 of the elevator car 51, the elevator car 51 is at rest between the stopping position 171 and the further stopping position 172 of the elevator system.

The detection of the fault in the drive unit 6 leads to the elevator system then being operated in a special operating mode. The diagnostic unit 8 of the elevator car 51 in this case determines that the drive function 6 of the first elevator car 51 should be replaced by a replacement function provided by an auxiliary device.

Furthermore, the detection of the fault in the drive unit 6 leads to the elevator car 51 being braked by means of its brake (not explicitly represented in FIG. 4 to FIG. 7) and held in a fixed position in the shaft 2. This situation is represented in FIG. 4. The first elevator car 51 is then assigned an auxiliary device.

Figure 5:
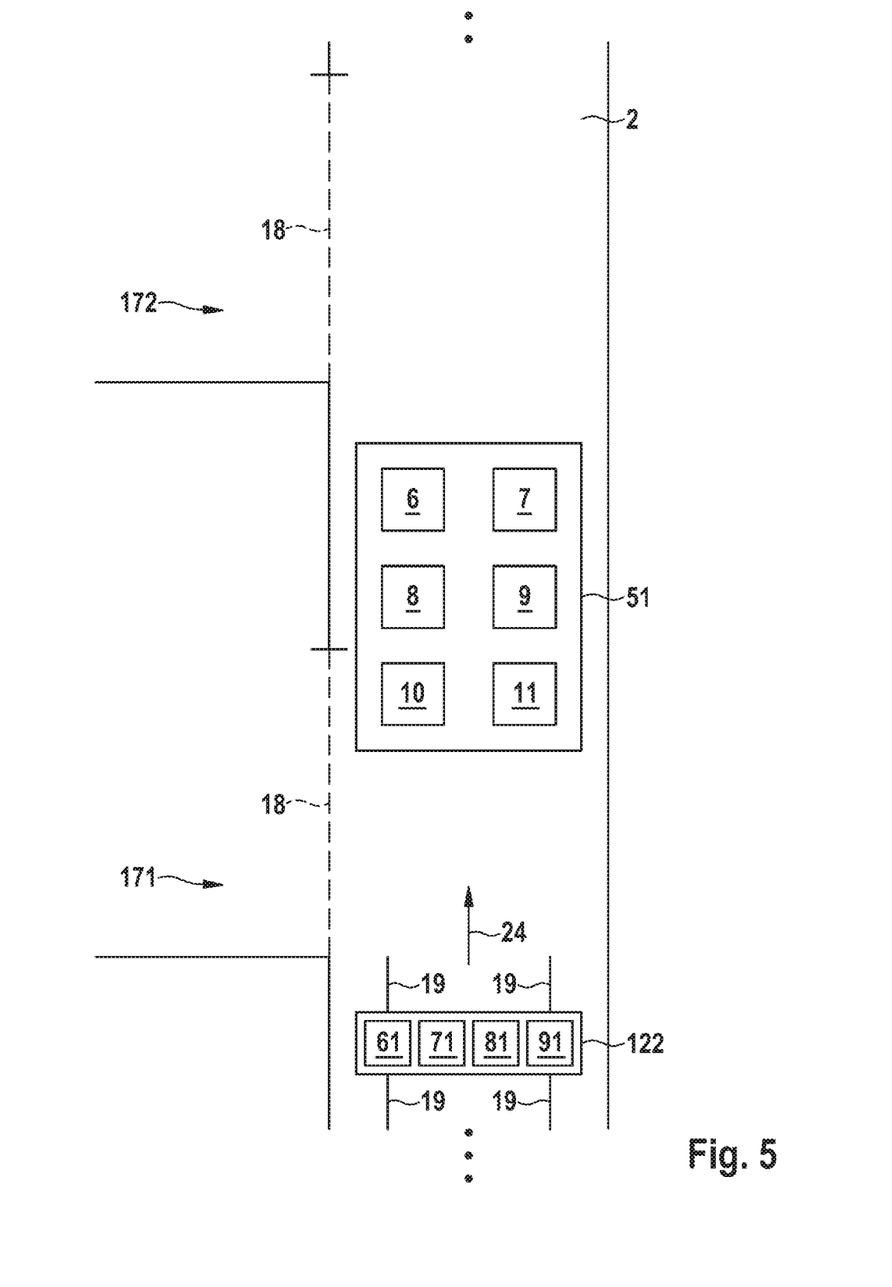
FIG. 5 is a simplified sectional schematic view of one exemplary embodiment of an elevator system configured to explain further method steps of one exemplary embodiment of a method.

In FIG. 5, it is in this case represented that the elevator car 51 is assigned the auxiliary device 122. To this end, this auxiliary device 122 is driven to the elevator car 51, which is symbolically represented in FIG. 5 by the arrow 24. The auxiliary device 122 in this case has its own drive unit 61, by means of which the auxiliary device 122 can be driven in the shaft system of the elevator system. The auxiliary device 122 furthermore comprises a control unit 71, a diagnostic unit 81 and a load measuring unit 91 (in FIG. 5 to FIG. 7, these units are respectively represented only symbolically). In particular, provision may be made that the auxiliary device 122 furthermore comprises further functions, or further units for carrying out further functions, in particular units for carrying out all the functions of an elevator car 51 of the elevator system.

Figure 6:
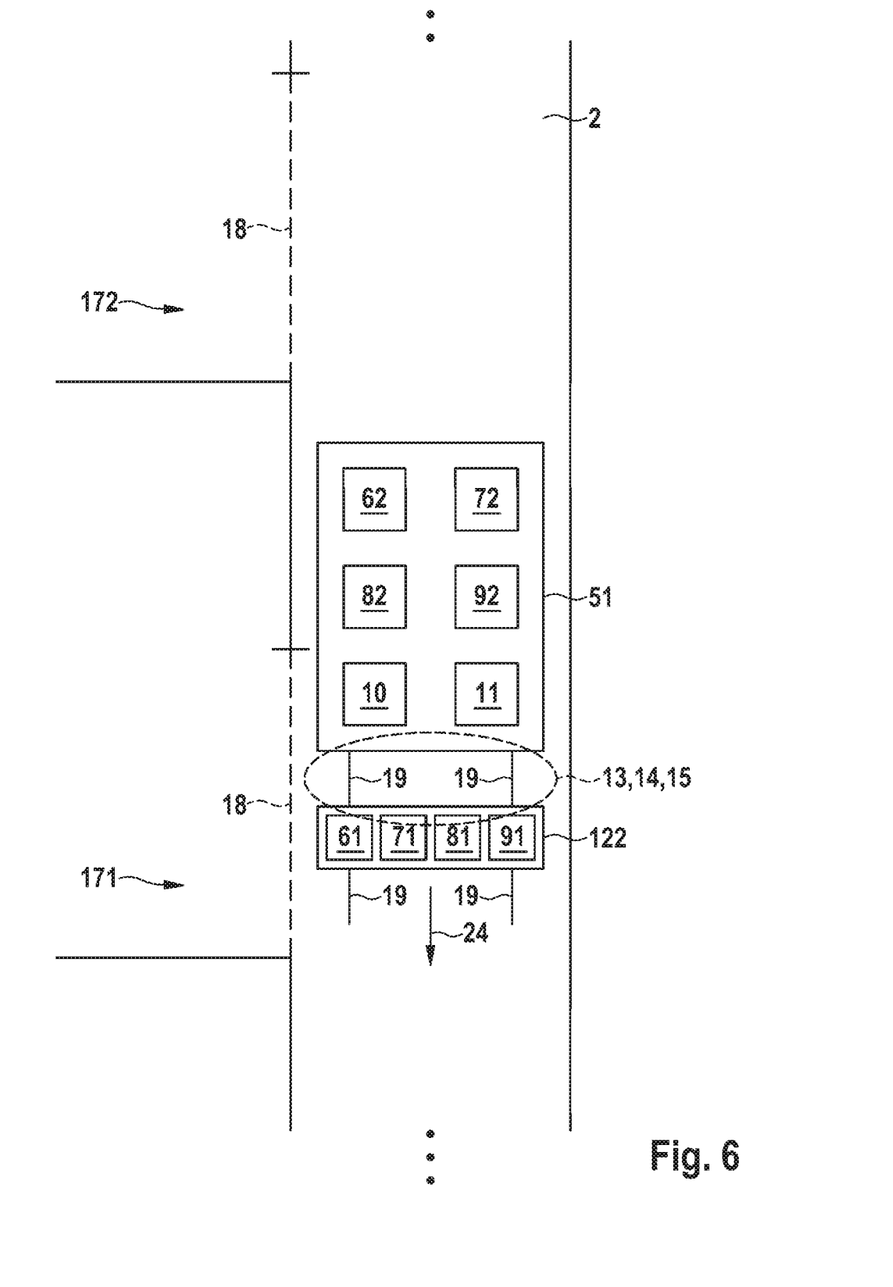
FIG. 6 is a simplified sectional schematic view of one exemplary embodiment of an elevator system configured to explain further method steps of one exemplary embodiment of a method.
Figure 7:
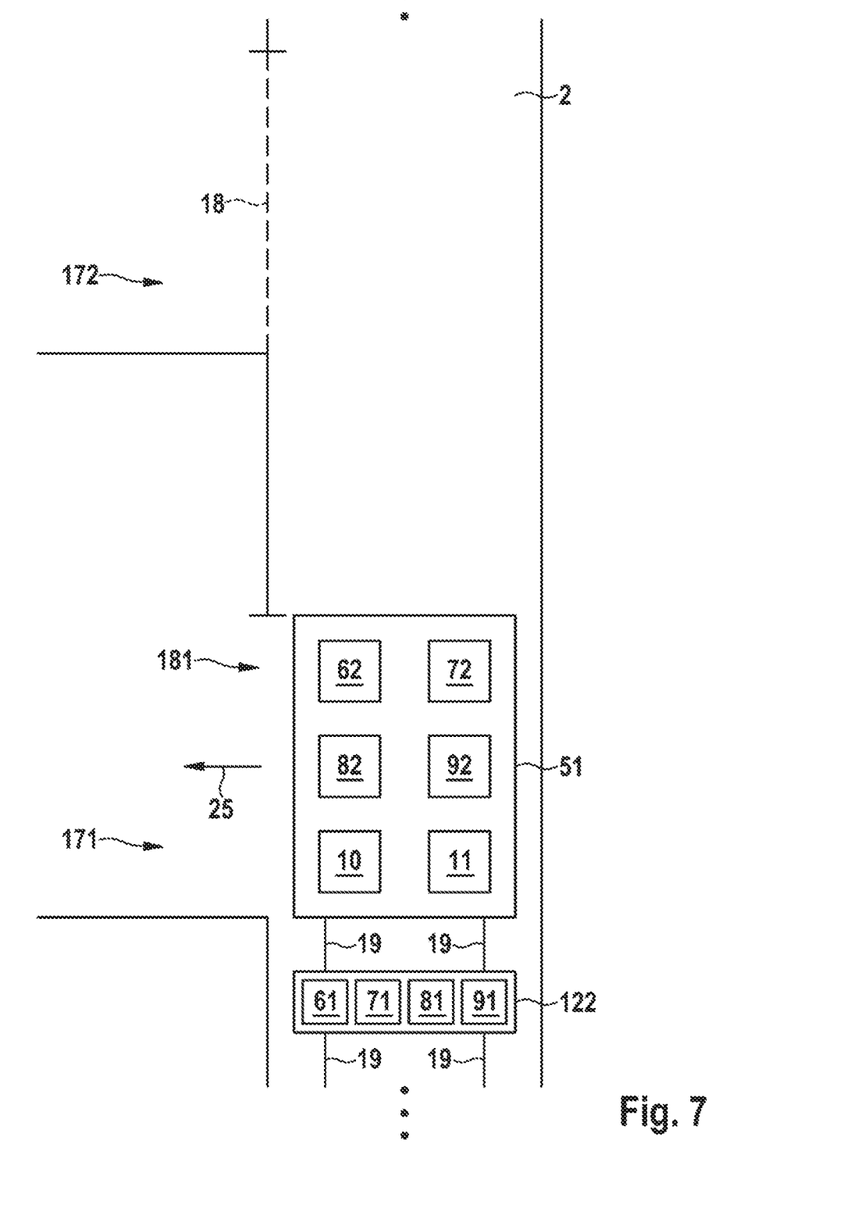
FIG. 7 is a simplified sectional schematic view of one exemplary embodiment of an elevator system configured to explain further method steps of one exemplary embodiment of a method.

In the exemplary embodiment represented in FIG. 5 to FIG. 7, the auxiliary device 122 is configured as a kind of platform. The auxiliary device 122 in this case has means 19 for establishing a connection with the first elevator car 51. The means 19 of the auxiliary device 122 are in this case configured, in particular, to establish a mechanical connection, a communication connection and an electrically conductive connection between the auxiliary device 122 and the elevator car 51. Instead of the platform proposed here, however, a further elevator car of the elevator system may again be used as an auxiliary device.

FIG. 6 symbolically represents the way in which the auxiliary device 122 is driven to the first elevator car 51. The establishment of a mechanical connection 13, an electrically conductive connection 14 and a communication connection 15 between the auxiliary device 122 and the elevator car 51 is in this case symbolized symbolically by the ellipse represented in dashes. The mechanical connection 13 established between the auxiliary device 122 and the elevator car 51 is in this case suitable for carrying the weight of the elevator car 51, and in particular the weight of the elevator car 51 when it is loaded. By means of the electrically conductive connection 14, the elevator car 51 is provided with an electricity supply, so that functions of the elevator car 51 which are still functional, for example the cabin light, can continue to be operated. This advantageously prevents persons still in the elevator car from becoming panicked by a prolonged failure of the cabin light.

By means of the communication connection 15 established between the auxiliary device 122 and the elevator car 51, in particular data, such as in particular control commands, can be transmitted between the auxiliary device 122 and the elevator car 51.

In the exemplary embodiment represented in FIG. 6, provision is made for the diagnostic unit 81 of the auxiliary device 122 to determine that both the function of the drive unit 6 and the function of the controller 7 as well as the function of the diagnostic unit 8 and the function of the load measuring unit 9 of the elevator car 51 should be deactivated. In FIG. 6, therefore, the elevator car 51 is represented with a deactivated drive unit 62, with a fully or partially deactivated controller 72, with a fully or partially deactivated diagnostic unit 82 and with a deactivated load measuring unit 92. These functions carried out by these units are then replaced with corresponding replacement functions by the auxiliary device 122.

After the aforementioned functions of the elevator car has been fully or partially deactivated, the control unit 71 of the auxiliary device 122 transmits a command to the elevator car 51 to release the brake (not explicitly represented in FIG. 6) of the elevator car 51. The brake of the elevator car 51 then opens, so that the entire weight of the elevator car 51 is carried by the auxiliary device 122 by means of the mechanical connection 13 established. A position change of the elevator car 51 does not take place in this case. The auxiliary device 122, which is carrying the elevator car 51, is then driven downward to the next stopping position 171, which is symbolically represented in FIG. 6 by the arrow 24. The control unit 71 of the auxiliary device 122 in this case communicates with the other elevator cars (not represented in FIG. 6) of the elevator system, and in particular communicates the current position of the auxiliary device 122 and of the elevator car 51, so that in particular collisions between the auxiliary device 122 and other elevator cars of the elevator system, or between the elevator car 51 and other elevator cars of the elevator system, are prevented.

If the auxiliary device 122 has been driven in the elevator shaft 2 by using its drive unit 61, which is controlled by means of the control unit 71 of the auxiliary device 122, in such a way that the first elevator car 51 is in the stopping position 171, the control unit 71 transmits a control command to the brake of the elevator car 51, so that the brake is triggered and the elevator car 51 is held in the stopping position 171 by the brake. The control unit 71 then transmits a control command to the door (not explicitly represented in FIG. 7) of the elevator car 51, so that the door of the elevator car 51 opens together with the shaft door 18.

FIG. 7 in this case represents the fact, by way of example, that the shaft do or 181 together with the elevator car door is open. The arrow 25 in this case represents the fact that it has been made possible for persons in the elevator car 51 to exit from the elevator car 51 into the floor assigned to the stopping position 171. In particular, provision may be made that the control unit 71 of the auxiliary device 122 in this case controls a display (not explicitly represented in FIG. 7) in the elevator car 51 in such a way that a message appears on the display that persons in the elevator car 51 must exit and the elevator car 51 is not to be used for further travel. Furthermore, a loudspeaker (not explicitly represented in FIG. 7) of the elevator cabin 51 is advantageously controlled by means of the control unit 71 of the auxiliary device 122, in such a way that attention is brought to the fact that this elevator car 51 is not to be entered by persons and is not ready to convey persons.

The load measuring unit 91 of the auxiliary device 122, which is configured to determine the load of the elevator car 51 by means of the mechanical connection 13 between the auxiliary device 122 and the elevator car 51, in particular to determine whether there are still persons in the elevator car 51, in this case measures the load of the elevator car 51. If the load measuring device 91 establishes that the elevator car 51 is empty, i.e. there are no longer any persons in the elevator car 51, the control unit 71 of the auxiliary device 122 transmits a further control command to the door of the elevator car 51, whereupon the door of the elevator car 51 is closed again.

The control unit 71 then transmits a further control command to the elevator car 51, the effect of which is that the brake of the elevator car 51 is released. The elevator car 51 is then driven by means of the auxiliary device 122 into a depot region, such as for example represented in FIG. 1 to FIG. 3. In the depot region, the elevator car 51 is parked. Advantageously, by using the diagnostic unit 81 of the auxiliary device 122, a diagnosis relating to the defect of the drive unit 6 of the elevator car 51 is already made. This fault diagnosis may be displayed on the display unit of the elevator car for subsequent repair. Furthermore, the diagnosis may be transmitted by means of a transmitter unit of the auxiliary device 122 to a central service facility, which is responsible for maintenance of the elevator system.

Until the drive unit 6 affected by the fault is repaired, or replaced, and the elevator car 51 can therefore be used again to convey persons, the elevator car 51 advantageously remains parked in the depot region. The auxiliary device 122, on the other hand, is already ready for use again directly after parking of the elevator car 51, and if need be may be assigned to other another elevator car.

The exemplary embodiments represented in the figures and explained in connection therewith serve to explain the invention and are not restrictive therefor. In particular, components of the elevator system are represented not true to detail and not true to scale, but merely schematically or symbolically to explain the invention.

What is claimed is:

1. A method of operating an elevator system, wherein the elevator system comprises a shaft system comprising at least one vertical elevator shaft, and a multiplicity of elevator cars which respectively have a plurality of functional components for carrying out different functions, the method comprising:
   assigning at least one auxiliary device, in a special operating mode of the elevator system, to a first elevator car of the multiplicity of elevator cars;
   forming a protective region around the first elevator car, into which only the at least one auxiliary device can be brought;
   bringing the at least one auxiliary device into the protective region to the first elevator car, by monitoring a distance from the at least one auxiliary device to the first elevator car;
   providing, via the at least one auxiliary device, a replacement function for at least one function of one of the functional components of the first elevator car;

replacing the corresponding at least one function of the functional component of the first elevator car with the replacement function provided by the at least one auxiliary device;
continuing to operate the elevator system by using the replacement function provided.

2. The method of claim 1, comprising determining, via a diagnostic unit, which function of the first elevator car should be replaced with the replacement function provided by the at least one auxiliary device.

3. The method of claim 1, wherein the at least one auxiliary device has its own drive unit, by which the at least one auxiliary device assigned to the first elevator car is driven to the first elevator car through the shaft system.

4. The method as claimed in claim 3, comprising assigning at least one second elevator car of the multiplicity of elevator cars as an auxiliary device to the first elevator car.

5. The method of claim 4, wherein a first one of the at least one second elevator car is driven as a first auxiliary device to the first elevator car from a first side, and/or a second one of the at least one second elevator car is driven as a second auxiliary device to the first elevator car from a second side, which is opposite to the first side.

6. The method of claim 1, comprising establishing a mechanical connection between the first elevator car and the at least one auxiliary device, the mechanical connection configured to withstand forces occurring when driving the first elevator car.

7. The method of claim 1, wherein the multiplicity of elevator cars respectively have, as a functional component, a drive unit by means of which the multiplicity of elevator cars can respectively be driven independently in the shaft system, the replacement function provided by the at least one auxiliary device replacing the drive function of the drive unit of the first elevator car.

8. The method of claim 6, wherein the multiplicity of elevator cars respectively have, as a functional component, a drive unit by means of which the multiplicity of elevator cars can respectively be driven independently in the shaft system, the replacement function provided by the at least one auxiliary device replacing the drive function of the drive unit of the first elevator car in that, by using the mechanical connection between the at least one auxiliary device and the first elevator car, the first elevator car is driven in the shaft system by driving the at least one auxiliary device.

9. The method of claim 1, comprising establishing an electrically conductive connection between the first elevator car and the at least one auxiliary device, an electricity supply for the first elevator car being provided by the electrically conductive connection produced.

10. The method of claim 1, wherein the multiplicity of elevator cars respectively have, as a functional component, an electricity supply by which the multiplicity of elevator cars are respectively supplied with the required electrical energy, the replacement function provided by the at least one auxiliary device replacing the function of the energy provision of the electricity supply of the first elevator car.

11. The method of claim 1, comprising establishing a communication connection for transmitting data between the first elevator car and the at least one auxiliary device.

12. The method of claim 11, comprising controlling functional components of the first elevator car by the communication connection, wherein the functional components are one or more of a brake, a door, a display, a loudspeaker, an illumination, an intercom, or a diagnostic device.

13. The method of claim 1, wherein the multiplicity of elevator cars respectively have, as a functional component, a communication interface for transmitting and/or receiving data, by means of which the multiplicity of elevator cars respectively transmit and/or receive data relating to the operation of the elevator system, the replacement function provided by the at least one auxiliary device replacing the function of transmitting and/or receiving data by means of the communication interface of the first elevator car.

14. The method of claim 1, wherein the multiplicity of elevator cars respectively have their own control unit, these control units together forming at least a part of the control system of the elevator system and controlling the driving of the multiplicity of elevator cars in the shaft system, the replacement function provided by the at least one auxiliary device replacing the function of the control by means of the control unit of the first elevator car.

15. The method of claim 1, comprising detecting a defect relating to the first elevator car and responsively changing a normal operating mode of the elevator system to the special operating mode.

16. The method of claim 1, comprising detecting defect relating to a first elevator car and responsively triggering a brake of the first elevator car, such that the first elevator car is braked by the triggering of the brake and held in a fixed position in the shaft system.

17. The method of claim 16, wherein the at least one auxiliary device is mechanically connected to the first elevator car, comprising:
releasing the brake of the first elevator car so that the weight of the first elevator car is received by the at least one auxiliary device,
driving the first elevator car into a stopping position of the elevator system via at least one auxiliary device, and
opening a door of the first elevator car in the stopping position.

18. The method of claim 1, comprising driving the first elevator car into a storage region located outside the driving paths of the elevator cars by using the replacement function provided by the at least one auxiliary device.

19. The method of claim 18, comprising bringing the elevator system from the special operating mode into a normal operating mode after the first elevator car is driven into the storage region.

20. An elevator system, comprising:
a shaft system; and
a multiplicity of elevator cars disposed in the shaft system that can be driven inside the shaft system, wherein the elevator system is configured to carry out the method of claim 1.

21. The system of claim 20, wherein the elevator system is operated by linear motors.

* * * * *